Figure 1:
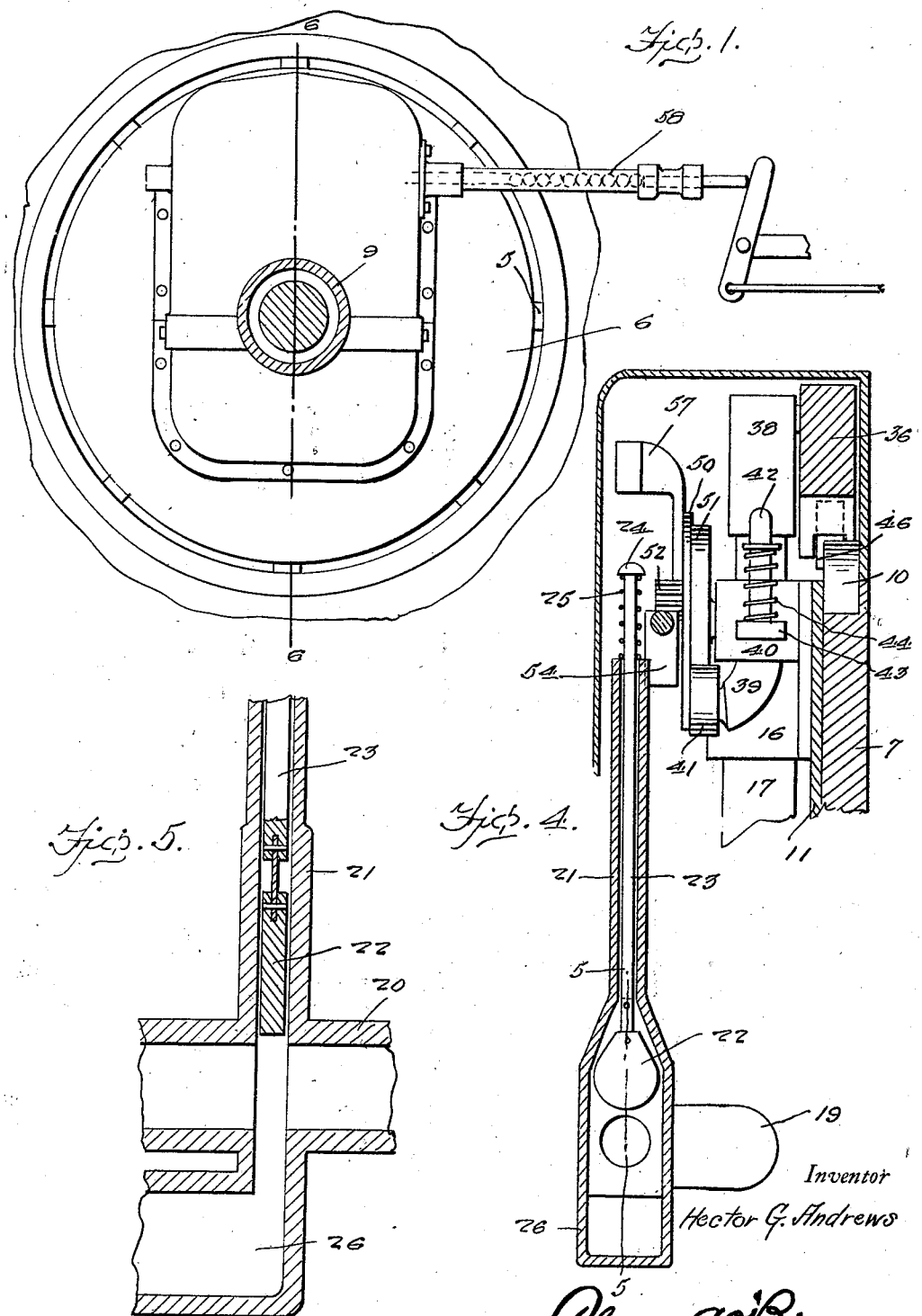

March 12, 1929.  H. G. ANDREWS  1,705,350
VEHICLE BRAKE
Filed June 14, 1927  4 Sheets-Sheet 2

Inventor
Hector G. Andrews
By Clarence A. O'Brien
Attorney

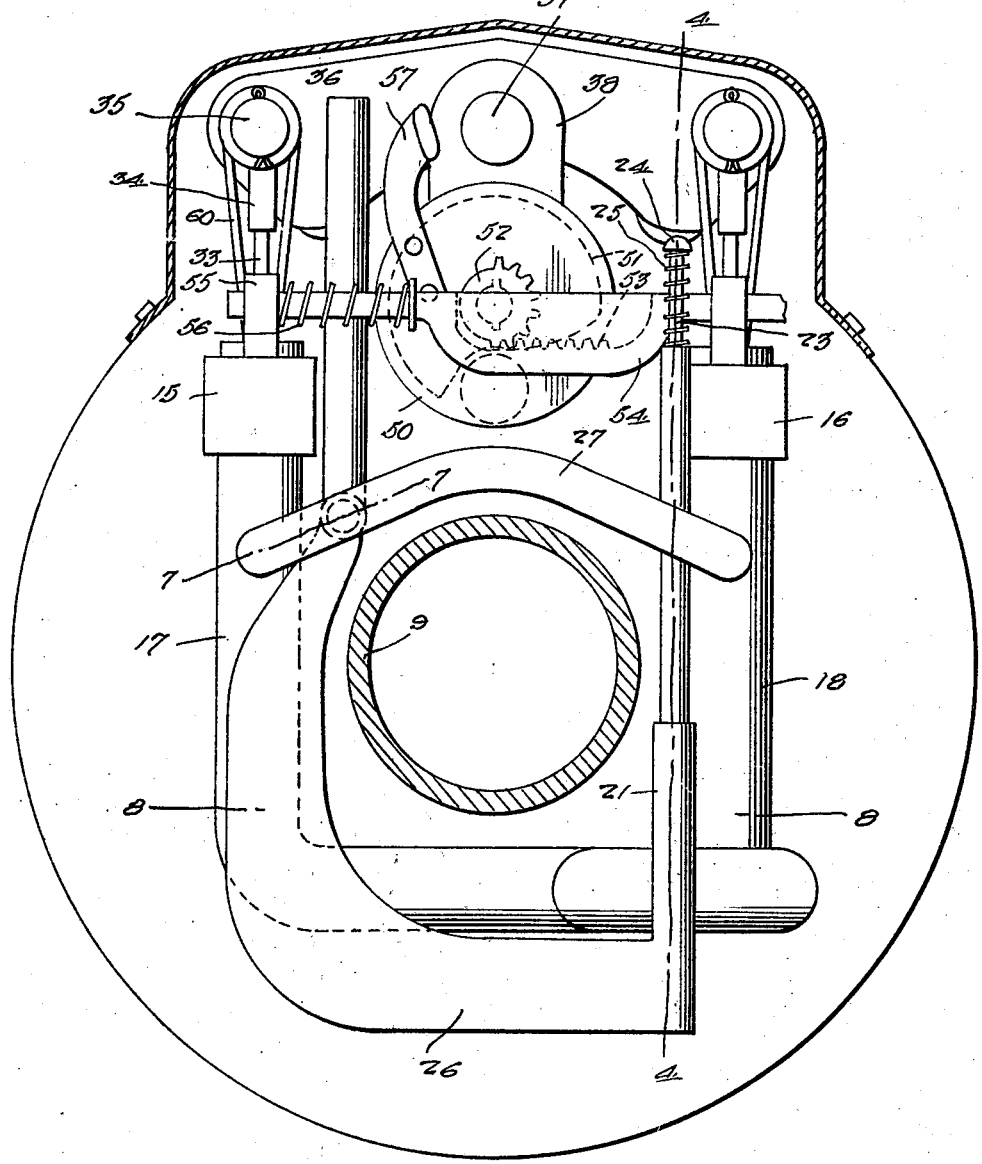

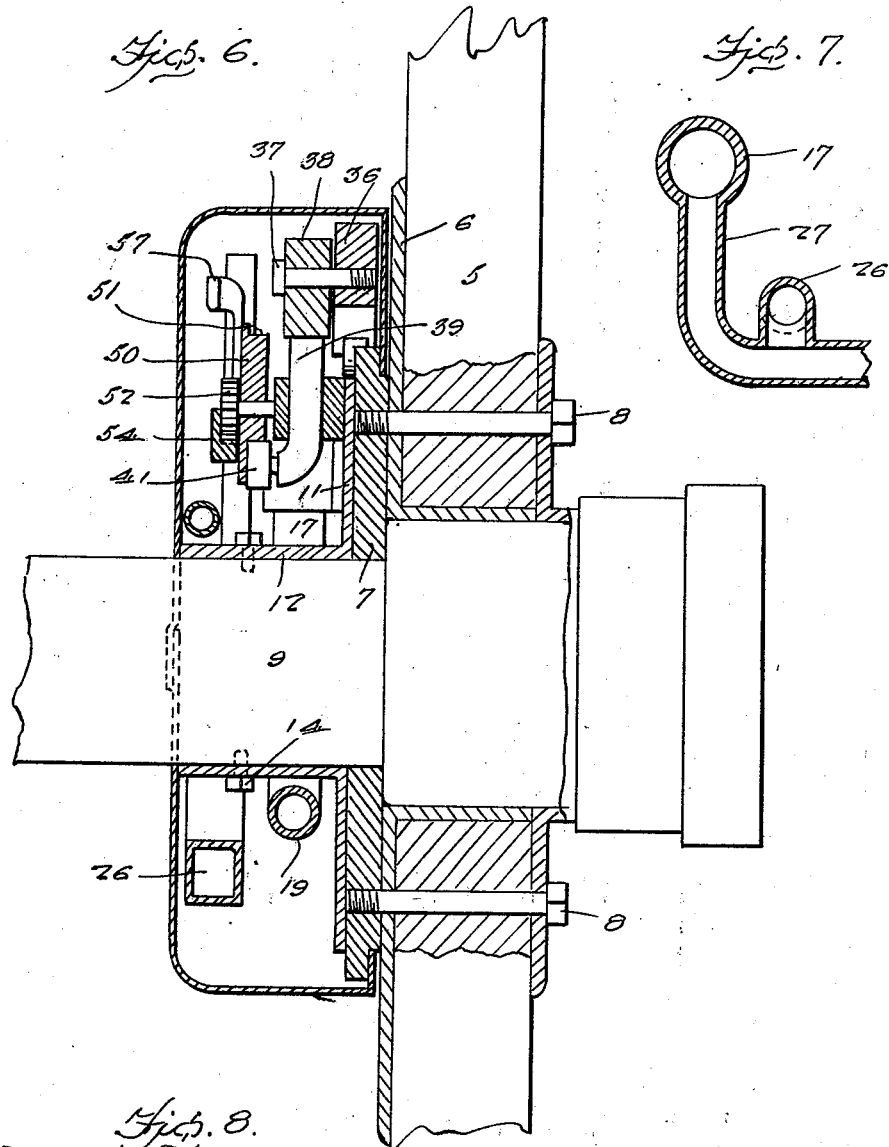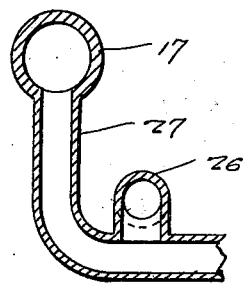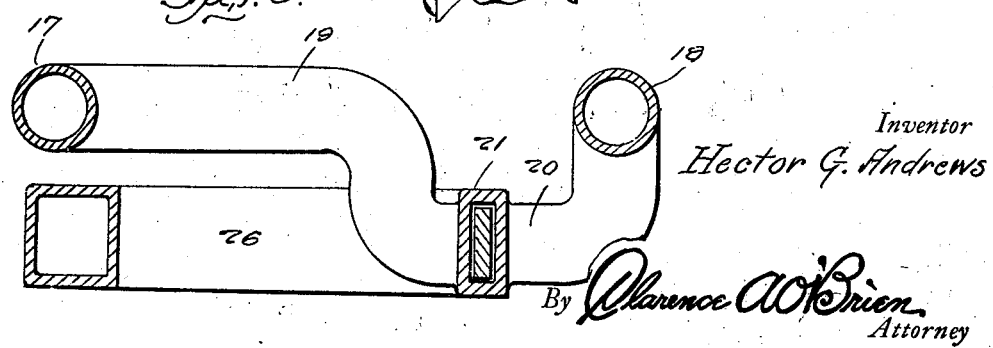

Patented Mar. 12, 1929.

1,705,350

UNITED STATES PATENT OFFICE.

HECTOR GEORGE ANDREWS, OF WINDSOR, ONTARIO, CANADA.

VEHICLE BRAKE.

Application filed June 14, 1927. Serial No. 198,794.

The present invention relates to a vehicle brake adapted for use upon automobiles and like vehicles and has for its principal object to provide a structure which relies for its braking operating upon a pump like mechanism which is only brought into operation when the braking action is desired.

Another very important object of the invention resides in the provision of a braking apparatus of this nature wherein the parts containing the liquid are not turned over with the wheel but remain in their upright positions as long as the vehicle to which the mechanism is attached remains in its normal position.

Another very important object of the invention lies in the provision of a braking mechanism of this nature which is positive in its action and does not utilize friction to attain its braking efficiency.

A still further very important object of the invention resides in the provision of a braking mechanism of this nature which is comparatively simple in its construction, inexpensive to manufacture, strong and durable, thoroughly efficient and reliable in use and operation, not likely to easily become out of order, requiring very little attention, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 2:
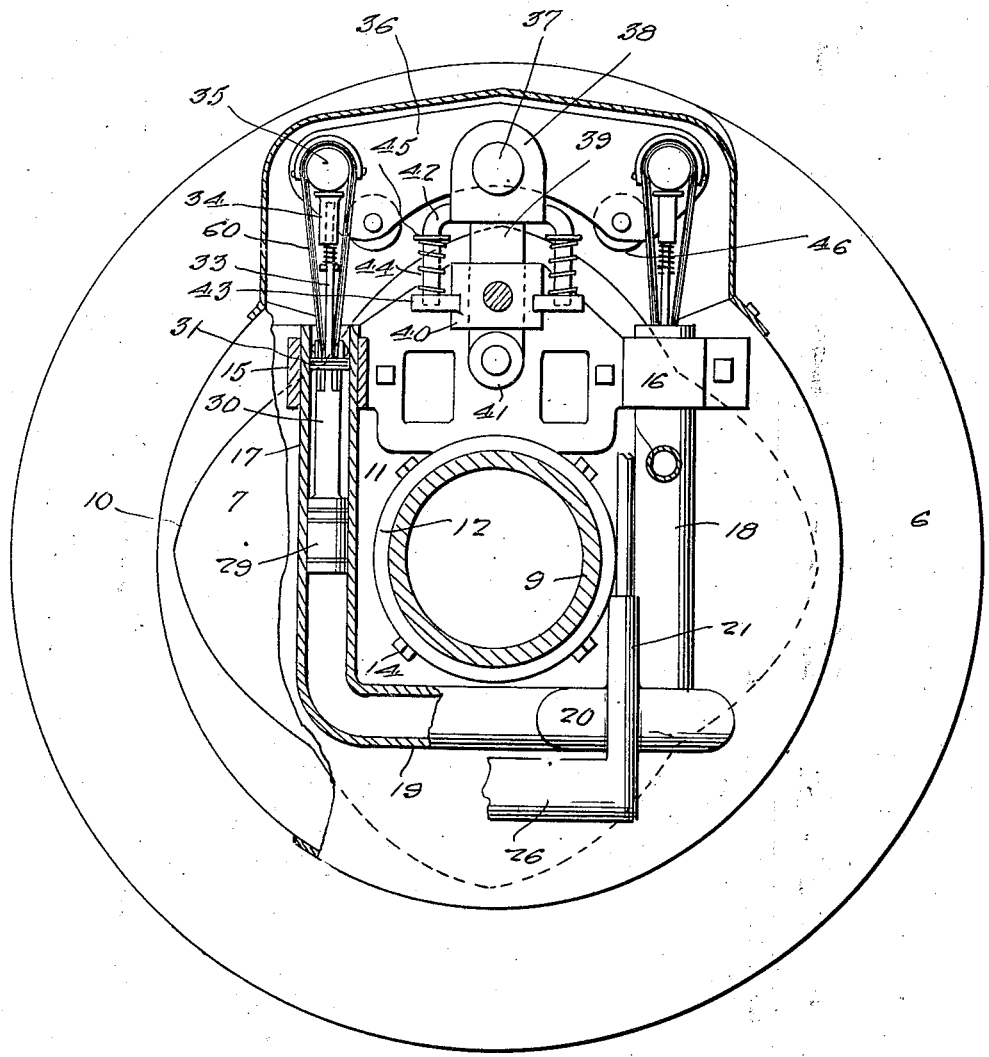

In the drawing:

Figure 1 is an elevational view showing the braking mechanism attached to the inner side of a wheel, Figure 2 is a sectional elevation thereof, Figure 3 is another sectional elevation thereof, Figure 4 is a sectional view taken substantially on the line 4—4 of Figure 3, with certain parts not shown, Figure 5 is an enlarged detail section taken substantially on the line 5—5 of Figure 4, Figure 6 is a vertical transverse section taken substantially on the line 6—6 of Figure 1, Figure 7 is an enlarged detail sectional view taken substantially on the line 7—7 of Figure 3, Figure 8 is an enlarged sectional view taken substantially on the line 8—8 of Figure 3.

Referring to the drawing in detail it will be seen that the numeral 5 denotes a wheel having a plate 6 rigidly secured thereto in any suitable manner for rotation therewith. A ring plate 7 is secured to the wheel assembly by bolts 8 or in any other suitable manner to rotate about the axle or axle housing 9. This ring-like plate 7 has a plurality of peripheral projections or cams or hooks 10 clearly shown in Figure 2. A ring-like plate 11 is formed on a sleeve 12 which is secured to the axle or axle housing or like non-rotating part by means of bolts 14 or in any other suitable manner. Brackets 15 and 16 support vertical cylinders 17 and 18 respectively the lower ends of which merge into a pipe 19 a portion of which is offset as is indicated at 20. A valve housing 21 rises from the offset portion 20 and has a valve 22 movable therein across the passage in the offset portion 20. A shank 23 is attached to the valve 22 and rises through the upper portion of the valve casing or housing 21 and terminates in a knob 24. A coil spring 25 is disposed about the outer end of the shank 21 impinging against the upper edge of the housing and the knob 24 for normally holding the valve 22 raised to allow free passage of fluid through the pipe 19. A reservoir 26 communicates with the bottom of the valve housing and extends to one side and then upwardly terminating a distance above the upper ends of the cylinders 17 and 18. A pipe 27 connects the upper intermediate portions of the cylinders 17 and 18 and is also connected to the upper portion of the reservoir 26. The reservoir 26 and the cylinders 17 and 18 with their connecting pipe 19 are filled with suitable fluid such as oil. Pistons 29 are slidable in the cylinders 17 and 18 and have rods 30 rising therefrom with gaskets or like packing 31 at their upper ends. Rods 33 are connected with the rods 30 and have spring-pressed tappets 34 at their upper ends engageable by lugs 35 projecting laterally from the ends of a rocker 36 pivoted at its center on a pin 37 in a yoke 38 of a bar 39 slidable through a bearing 40 and having a roller 41 journaled at its lower end. Extension arms 42 extend from the yoke 38 through branches 43 on the bearings 40 and springs 44 disposed thereabout impinging against the branches 43 and against stops 45 to hold the yoke upwardly. Rollers 46 are journaled adjacent the ends of the rocker 36 for engagement with the hooks 10 of the ring-like plate 7 when the yoke 38 and parts attached thereto are moved downwardly by means of a cam structure 50 having a cam portion 51 engaging the roller 41 rotatable by a gear 52 engaging a rack portion 53 of a bar 54 slidably through bearings 55 rising from brackets 15 and 16 and normally held in a predetermined position by means of a spring 56.

An arm 57 is attached to the cam structure 50 for engaging the knob 24 when the bar 54 is pushed to the left in Figure 3 by means of suitable mechanism such as is illustrated at 58 in Figure 1. Thus it will be seen that after the roller 41 is brought to the outside of the camway 51 of the cam structure 50 the arm 57 engages the knob 24 to tend to close the valve to resist the flow of the fluid through the pipe portion 19 connecting the bottoms of the two cylinders 17 and 18.

When the rollers 46 have been brought into full engagement with the humps 10 as they move round by rotation of the wheel, and when the pistons have reached their maximum stroke, the valve is then closed, causing a very efficient and positive braking action as will be apparent because of the tendency to form vacuum behind the pistons as they move upwardly. The valve is not closed until the pumping mechanism has been brought into full motion.

It will be seen that the parts containing the oil or like fluid are always maintained full by reason of the reservoir 26 which will take care of any of the oil which is sucked out of the cylinders during the actual braking operation. In order to maintain the tappets 34 in engagement with the lugs 35 cables 60 are connected to the rods 30 and pass about the lugs 35 and to pull the pistons upwardly as is indicated to advantage in Figure 2.

I have described the invention in connection with one wheel only since it will be a mere matter of engineering design to accommodate the device to all four or more wheels of a vehicle. The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit and scope of the invention as hereinafter claimed or sacrificing any of its advantages.

Having thus described my invention, what I claim as new is:

1. In a braking mechanism of the class described, a movable member, a stationary member, said movable member having a hump, a pumping mechanism on the stationary member, movable means on the stationary member for engaging the hump to set up action of the pumping mechanism, and means for adjusting the means to an operative and inoperative position, said pumping mechanism comprising a pair of cylinders, pistons movable in said cylinders and operatively connected with the first mentioned means, a pipe connecting the cylinders, and a valve mechanism associated with said pipe and operable by the second mentioned means.

2. In a braking mechanism of the class described, a movable member, a stationary member, said movable member having a hump, a pumping mechanism on the stationary member, movable means on the stationary member for engaging the hump to set up action of the pumping mechanism, and means for adjusting the means to an operative and inoperative position, said pumping mechanism comprising a pair of cylinders, pistons movable in said cylinders and operatively connected with the first mentioned means, a pipe connecting the cylinders, a valve mechanism associated with said pipe and operable by the second mentioned means, and a reservoir connected with said pipe.

3. In a braking mechanism of the class described, a movable member, a stationary member, said movable member having a hump, a pumping mechanism on the stationary member, movable means on the stationary member for engaging the hump to set up action of the pumping mechanism, and means for adjusting the means to an operative and inoperative position, said pumping mechanism comprising a pair of cylinders, pistons movable in said cylinders and operatively connected with the first mentioned means, a pipe connecting the cylinders, a valve mechanism associated with said pipe and operable by the second mentioned means, a reservoir connected with said pipe, and a pipe connecting the upper intermediate portions of the cylinders and the upper portion of the reservoir.

4. In a braking mechanism of the class described, a rotatable member, a stationary member, a pair of cylinders mounted on the stationary member, a pipe connecting the bottom of the cylinders, valve mechanism in said pipe, a valve operating rod connected with the valve mechanism, means for normally holding the valve mechanism open, pistons in the cylinders, a rocker, means movably mounted on the stationary member for pivotally supporting the rocker, said rotatable member having a hump engageable with the ends of the rocker, means connecting the ends of the rocker with the pistons, cam means operating the rocker supporting means, and an arm on said cam means swingable to engage the valve rod.

5. In a braking mechanism of the class described, a stationary member; a movable member on the stationary member; a pumping mechanism on the stationary member comprising a pair of cylinders, pistons movable in said cylinders, a pipe connecting the cylinders, and a valve mechanism associated with the pipe; and means adjustable to operatively connect the pistons with the movable member.

In testimony whereof I affix my signature.

HECTOR GEORGE ANDREWS.